US006556563B1

(12) United States Patent
Yarlagadda

(10) Patent No.: US 6,556,563 B1
(45) Date of Patent: Apr. 29, 2003

(54) INTELLIGENT VOICE BRIDGING

(75) Inventor: Madhu Yarlagadda, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/658,781

(22) Filed: Sep. 11, 2000

(51) Int. Cl.$^7$ ................................................. H04J 3/16
(52) U.S. Cl. ........................ 370/352; 370/353; 370/356; 370/401
(58) Field of Search .................................. 370/352, 353, 370/356, 401; 379/88.17, 90.01, 93.01

(56) References Cited

U.S. PATENT DOCUMENTS

| | | | |
|---|---|---|---|
| 5,333,266 A | 7/1994 | Boaz et al. | |
| 5,497,373 A | 3/1996 | Hulen et al. | |
| 5,592,480 A | 1/1997 | Carney et al. | |
| 5,647,002 A | 7/1997 | Brunson | |
| 5,809,128 A | * 9/1998 | McMullin | 379/215.01 |
| 5,872,926 A | 2/1999 | Levac et al. | |
| 5,884,262 A | 3/1999 | Wise et al. | |
| 5,951,638 A | 9/1999 | Hoss et al. | |
| 5,983,227 A | 11/1999 | Nazem et al. | |
| 6,055,240 A | 4/2000 | Tunnicliffe | |
| 6,061,347 A | * 5/2000 | Hollatz et al. | 370/352 |
| 6,078,886 A | * 6/2000 | Dragosh et al. | 704/270 |
| 6,137,864 A | 10/2000 | Yaker | |
| 6,144,667 A | * 11/2000 | Doshi et al. | 370/401 |
| 6,175,858 B1 | 1/2001 | Bulfer et al. | |
| 6,181,781 B1 | 1/2001 | Porter et al. | |
| 6,185,565 B1 | 2/2001 | Meubus et al. | |
| 6,230,190 B1 | 5/2001 | Edmonds et al. | |
| 6,233,318 B1 | * 5/2001 | Picard et al. | 379/88.17 |
| 6,240,448 B1 | 5/2001 | Imielinski et al. | |
| 6,246,758 B1 | * 6/2001 | Low et al. | 379/230 |
| 6,269,095 B1 | 7/2001 | Neubauer et al. | |
| 6,269,336 B1 | 7/2001 | Ladd et al. | |
| 6,282,192 B1 | * 8/2001 | Murphy et al. | 370/352 |
| 6,282,270 B1 | 8/2001 | Porter | |
| 6,292,480 B1 | * 9/2001 | May | 370/352 |
| 6,301,245 B1 | 10/2001 | Luzeski et al. | |
| 2001/0030958 A1 | 10/2001 | Kichise | |

FOREIGN PATENT DOCUMENTS

| | | | |
|---|---|---|---|
| WO | US99/28480 | 12/1999 | H04M/3/493 |

* cited by examiner

*Primary Examiner*—Salvatore Cangialosi
(74) *Attorney, Agent, or Firm*—Townsend, Townsend & Crew LLP

(57) ABSTRACT

An intelligent voice bridging system and process that scaleably extends the functionality of a VOIP telecommunication application by bridging data from external components into the VOIP data stream.

7 Claims, 6 Drawing Sheets

INTELLIGENT VOICE BRIDGING

CROSS-REFERENCES TO RELATED APPLICATIONS

This application is related to and claims the benefit of co-pending applications Ser. No. 09/658,771, entitled "Voice Integrated VOIP System" Ser. No. 09/658,802, entitled "Intelligent Voice Converter" and Ser. No. 09/659,233, entitled "Message Store Architecture", all filed Sep.11, 2000, the disclosures of which are incorporated herein by reference.

BACKGROUND OF THE INVENTION

Telecommunication application servers that provide services using either VOIP (Voice over IP) or traditional PSTN (Public Switched Telephone Network) are known. However, one problem encountered by all applications is that VOIP platforms use data formats that are optimized for IP based networks. Most of the TTS (text-to-speech) and ASR (automatic speech recognition) systems that are in the industry today were designed for public switched telephone networks (PSTNs) and do not support native VOIP formats. Because of this, all of the VOIP data needs to be converted into a format that that can be handled by the ASR and TTS subsystems. However, such conversion is expensive and further, if every new component is handling data in a different way then multiple simultaneous conversion is not possible.

From the above it is evident that an improved mechanism is required that can couple external functional components like ASR, TTS, etc., into a VOIP data path to provide reach functionality for a VOIP application.

SUMMARY OF THE INVENTION

According to one aspect of the invention, voice bridging enables coupling between VOIP and external components in a scalable manner to support a large subscriber base.

According to another aspect of the invention, a software base data coupling module non-intrusively couples data from external components, such as TTS/ASR into a VOIP application.

According to another aspect of the invention, intelligent voice bridging controls the duration that such coupling is effective to equal the time that the functional component is required, hence enabling multiplexing of the same resource across many users and hence increasing efficiency for resource utilization. One embodiment enables multiple functional components to be inserted in a non-intrusive manner into the existing VOIP data path.

According to another aspect of the invention, a method and a mechanism couples data from industry standard functional components into the data path of a VOIP (Voice Over IP) application. In one embodiment, the VOIP application creates a special User Datagram Protocol (UDP) port that is used to receive bridge data that has to be sent to the VOIP application. The bridging may couple voice data in either a single direction called half-duplex mode or in both directions at the same time, known as full-duplex mode. The half-duplex mode of coupling may be done downstream or upstream.

According to another aspect of the invention, a cache is maintained that may be activated for the downstream data. Caching adds additional optimization so that, in the event of a replay request, the data from the cache may be played rather than having to generate the data again from the source.

According to another aspect of the invention, packets provided from the external application include a session number that may be used to identify portions of returned data to be played back at a user's request.

A further understanding of the nature and advantages of the invention herein may be realized by reference to the remaining portions of the specification and the attached drawings.

DESCRIPTION OF THE SPECIFIC EMBODIMENTS

Figure 1:
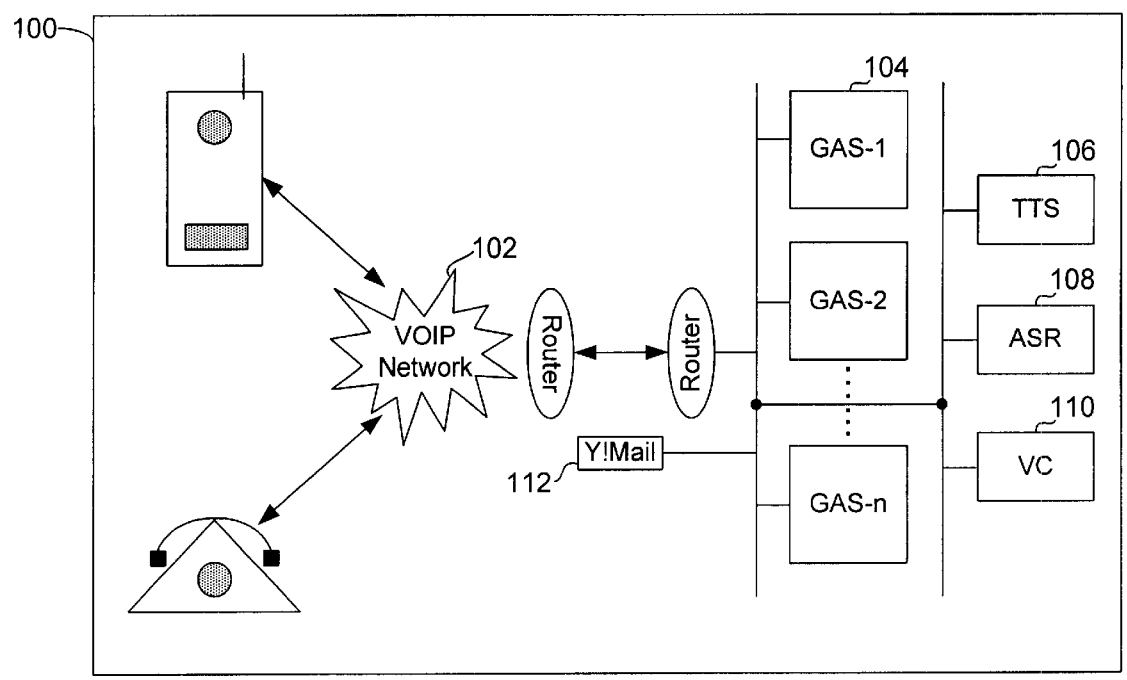
FIG. 1 is a block diagram of the architecture of a VOIP telecommunication server system.

The invention will now be described with reference to the preferred embodiments. FIG. 1 shows a distributed client server system 100 that is used to provide telecommunication application services to callers/subscribers over a managed VOIP network 102. The architecture comprises the following systems in one embodiment:

GAS (Gateway Access Server)

GAS 104 is a server that runs the telecommunication applications. It has a functional component called voice bridging that enables external systems and features to be integrated into the data path of the application running on GAS 104. As shown, GAS 104 includes any number of servers, GAS 1–N.

TTS (Text-to-Speech Server)

TTS server 106 is responsible for converting text into speech that may be played to the user. Some of the applications that use this feature include listening to email and other text-based content from the phone. Many existing TTS servers are designed to operate in PSTN and to generate voice data not in native VOIP format.

ASR (Automatic Speech Recognition)

ASR server 108 is responsible for recognition of voice data sent to it and translating it to text that is sent back to the requester. Many existing ASR servers are designed to operate in PSTN and to process voice data not in native VOIP format.

VC (Voice Converter)

VC 110 is a server that converts one format of the voice into another. For this particular embodiment, VC 110 converts PCM voice data into G723.1 format and vice-versa. The VC 110 may be utilized to convert output from TTS 106 to native VOIP format and to convert VOIP format to PSTN format for use by ASR. Additionally, VC 110 may convert voiced data to other VOIP formats.

Y! Mail

Y!Mail 112 (Yahoo! Mail Servers): GAS 104 talks to Yahoo! mail servers 112 to enable subscribers to listen to their email using the phone.

The art of data transfer over TCP/IP and UDP/IP is well known and will not be addressed in detail here. The intelligent voice bridge described below enables a VOIP application to interact with standard PSTN external functional components, like TTS, ASR, etc., by coupling the voice data from these components to the application's VOIP data path.

Figure 2:
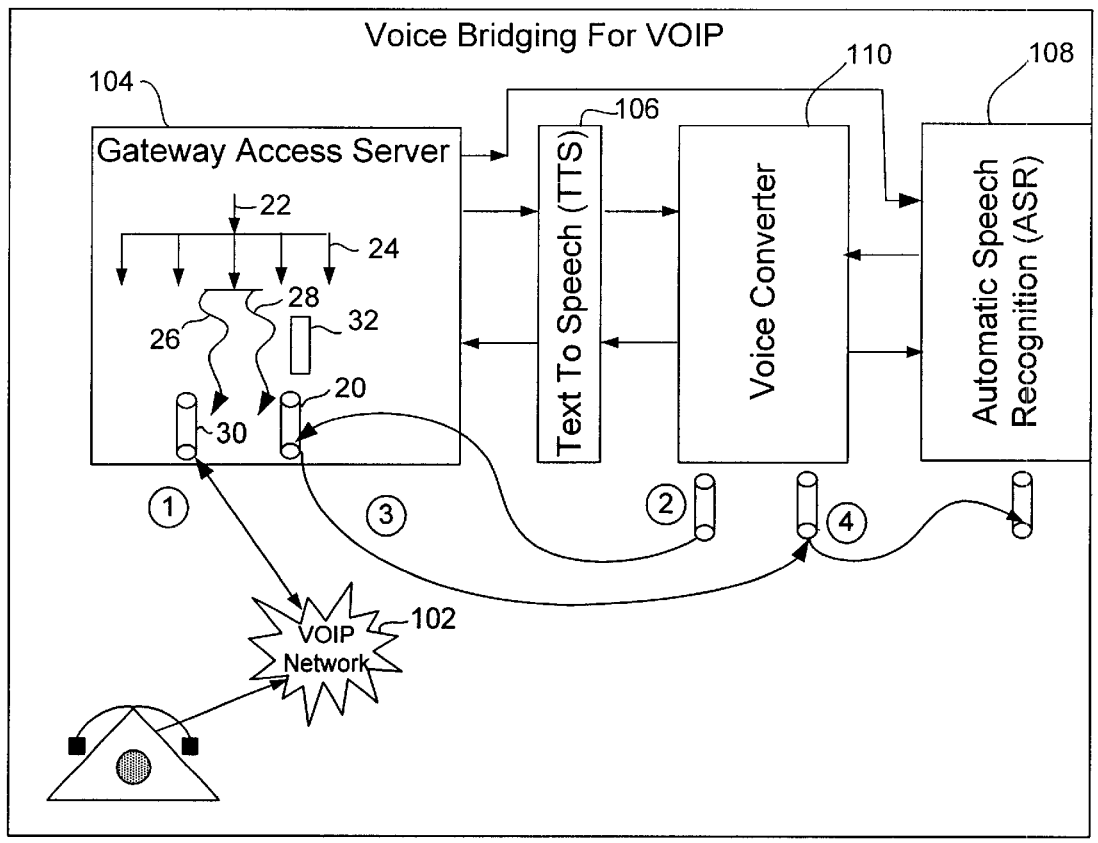
FIG. 2 is a block and flow diagram of an embodiment of a voice bridging system for VOIP.
Figure 3:
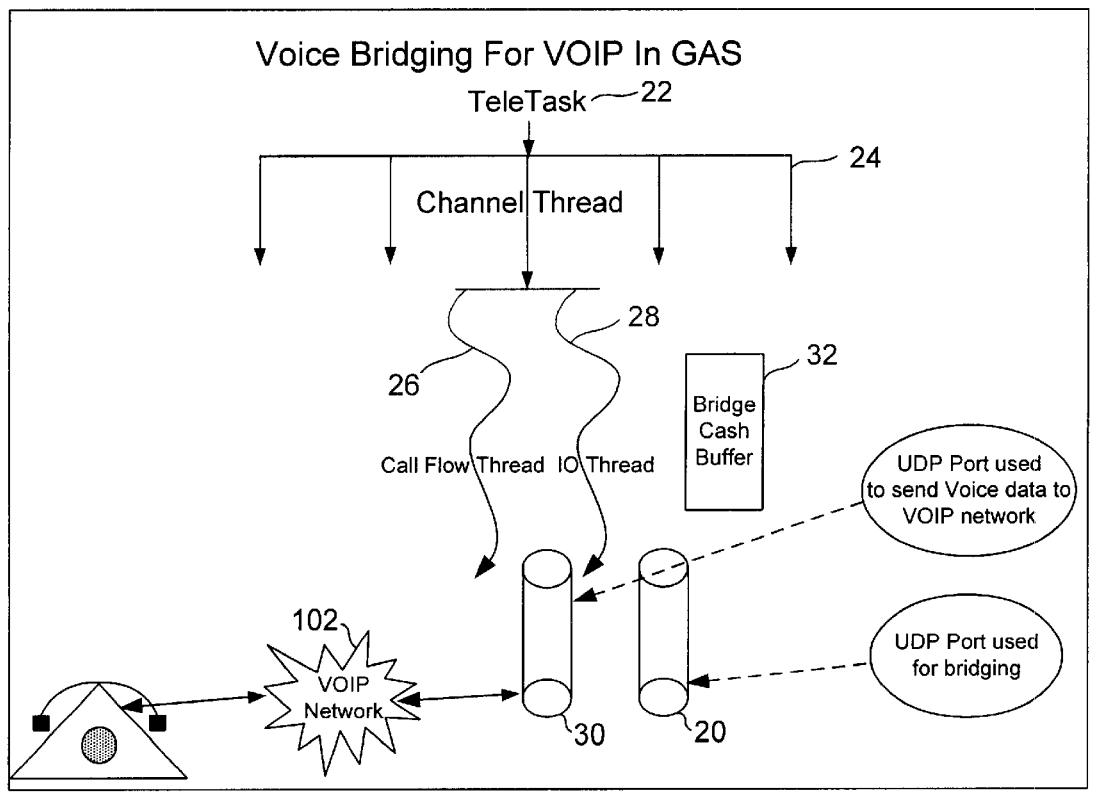
FIG. 3 is more detailed depiction of parts of FIG. 2.

Referring to FIGS. 2 and 3, the embodiment includes a UDP port called the bridging port 20. All the data that is bridged is sent from or received using this port. GAS 104 has a process called TeleTask 22, which has several threads called channel threads 24. Each of the channel threads 24 is responsible for one subscriber over the VOIP system. A channel thread then splits into two threads called a call flow thread 26 and an IO thread 28. Call flow thread 26 runs the application call flow while IO thread 28 is responsible for all of the IO. In a preferred embodiment, the bridging functionality resides in IO thread 28 and interacts with call flow thread 26.

As shown in FIGS. 2 and 3, IO thread 28 has two UDP/IP ports. The first port is a VOIP port 30 that is used to send and receive data to VOIP network 102. The second port is the bridge port 20 that is used to bridge the external functional components. A bridge cache buffer 32 is shown in FIG. 3.

Intelligent Voice Bridging is a process having the capability of enabling an external application to interact with a VOIP application by sending data to a dedicated UDP port called bridge UDP port 20. The VOIP application creates and uses bridge UDP port 20 to interact with external application components like TTS 106, ASR 108, etc. The external application data may be queued in UDP port 20 when ready to be sent to VOIP network 102. I/O thread 28 may copy data from bridge port 20 to VOIP port 30 and from VOIP port 30 to the bridge port 20.

Figure 4:
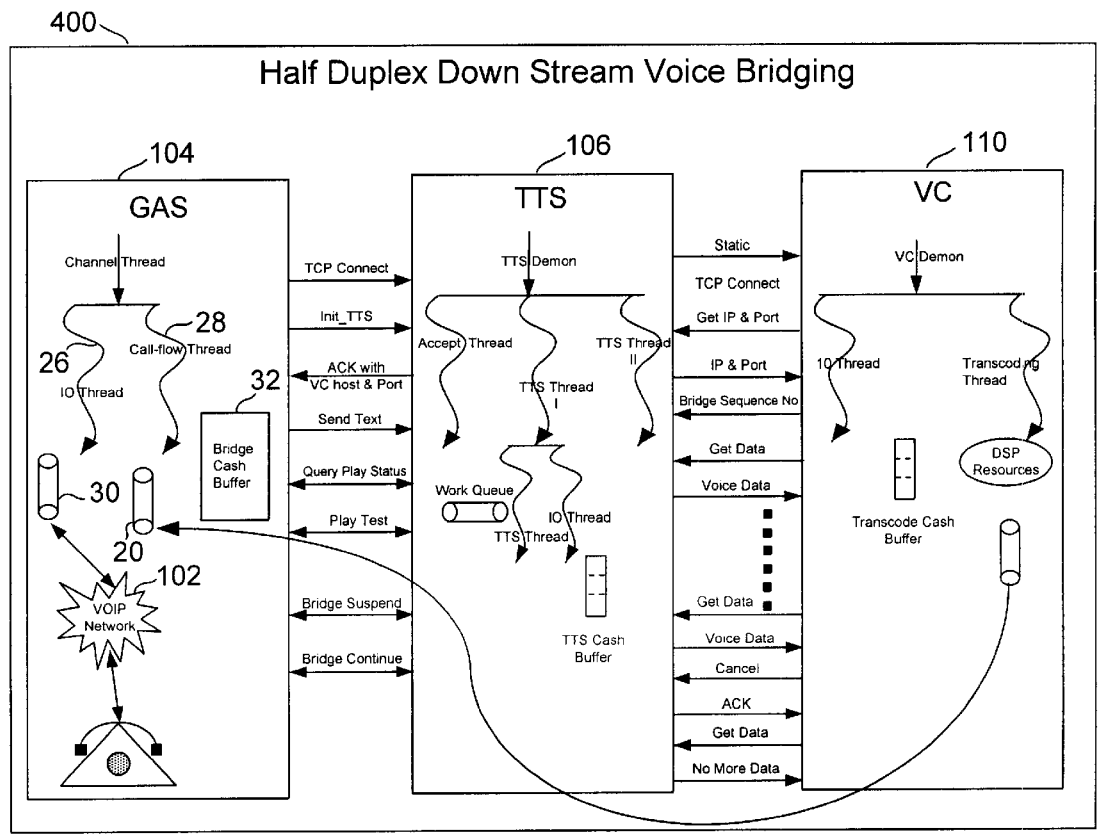
FIG. 4 is a block and flow diagram depicting half-duplex upstream bridging.
Figure 5:
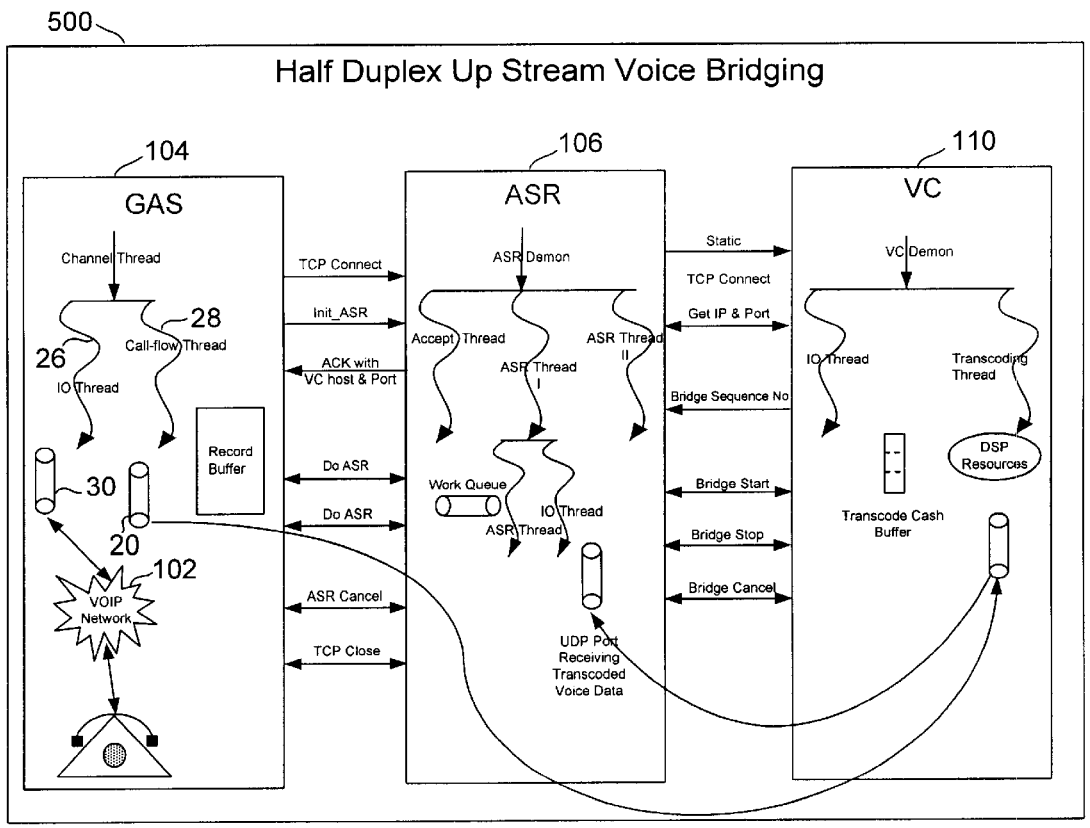
FIG. 5 is a block and flow diagram depicting half-duplex downstream bridging.

As shown in FIGS. 4 and 5, external applications components may now be added to the VOIP solution. The embodiment supports following modes of operation.

For example, a PSTN email reading application uses TTS 106, which converts text to voice data in PSTN format. With automatic voice bridging, the PSTN format voice data is automatically sent to a voice converter 110 to convert the PSTN format voice data to VOIP format voice data that may be used by a VOIP email reading application.

Half-Duplex Upstream Bridging

FIG. 5 shows an example of half-duplex upstream voice bridging system 500. In this mode, the VOIP data will be sent to the external application using the UDP bridge socket 20. If the external recipient of the data is capable of receiving the native VOIP data format, then the data will be sent as is. If the recipient requires a different data format then, data will be sent to a voice converter that transcodes the data to the desired format and sends it to the external application.

The VOIP application has a capability to specify the duration for which upstream bridging is required. The application may request upstream bridging along with message record operation. During message record operation, IO thread 26 will read the data and store it into a record buffer for the application to store the message if required and also send it to the external resource.

IO thread 26 is capable of doing data end pointing while performing bridging if requested by the application. Data end pointing is the process of identifying possible start of voice and end of voice utterance in a given data stream, accessing requested voice data based on the silence boundaries, and sending only the end pointed data to the destination.

For example if the application does as follows:

Application: "Please say the city name for which you want the weather"

Subscriber: "- - - - - San—Jose - - - - ", where "-" represents silence.

The response is the name of the city. Now transcoding is performed on the voice data that contains the city. However from the data stream the process has to identify where the city utterance starts and this process is called endpointing. The process looks for extended silence at the beginning and at the end. Everything in between is the data of interest. This data is then bridged to the voice converter for transcoding.

The use of data endpointing in conjunction with intelligent voice bridging reduces the cost of a system by allowing voice data from other subscribers to be processed during silences.

Half-Duplex Downstream Bridging

FIG. 4 shows an example of a half-duplex upstream voice bridging system 400. In this mode, the call flow requests external application data to be bridged into the VOIP stream. For example, if the call flow requires an e-mail to be read to the caller, it will request the external TTS engine to convert text into voice. If the output voice data is in the native VOIP format, then the voice data will be bridged directly. However, if the voice data requires conversion into the VOIP format, then the voice data may be sent to VC 110 (Voice Converter). Voice converter 110 converts the voice data to VOIP format and sends the converted voice data to UDP bridging socket 20. At this point the call flow will call bridge 30, which starts reading the data out of the bridge port 20 and sending it to VOIP network 102 at a network transfer rate.

Half-Duplex Downstream Bridging with Caching

This mode is very similar to the half duplex down stream bridging mode described previously, but with additional caching functionality. In this mode, as the bridged data is sent to VOIP network 102, a copy of the bridged data is also maintained in the bridge cache. The cached data is used in the event the user requests a replay operation so that the external system need not regenerate the data. Instead, the data from the cache is used to play back to network 102.

For example, if the user wants to listen to an e-mail, the user request to listen to e-mail is sent to the application call flow. The call flow retrieves the e-mail text from memory and sends the text to external TTS system 106, which converts the text to speech. If the voice data is not in the VOIP network native CODEC format, then the voice data is sent to voice converter 110. The voice converter transcodes the voice data and sends it to bridge port 20. After placing enough voice data in bridge port 20, voice converter 110 will send a "ready to play" signal to the call flow. At that point, the call flow can call bridge operation with caching. This call will trigger IO thread 28 to read voice data from bridge port 20, store a copy of it in the cache, and then send the voice data to VOIP network 102.

If the entire e-mail was played, then IO thread 26 will send a "bridge done" event to the call flow. In the event a user interrupts the bridging, the user's input is sent to the call flow and the call flow will analyze the user input. If the input is a request to skip to the next e-mail, then the call flow will cancel the current bridge operation and stop TTS 106 and VC 110 and then get them ready to start working on the next e-mail. If the user request was to replay the e-mail, then the call flow will pause TTS 106, VC 110, and the bridge procedures, and will call a method called re-bridge, which will read the data from the cache memory and replay it to network 102. When all data from the cache has been played, IO thread 26 will send an event called "Bridge Resume" and will start reading from the bridge socket, store a copy of the read data in the cache, and also send the read data to VOIP network 102. In the meantime, the call flow will react to the "Bridge Resume" event by resuming TTS 106 and VC 110, which are in the Pause State, waiting to be resumed.

Full-Duplex Bridging

Full duplex bridging, as shown in FIG. 2, is the mode in which both upstream and downstream bridging happens at the same time. The embodiment being described supports both upstream and downstream bridging independently. Full duplex bridging enables both upstream and downstream bridging at the same time.

Voice Packet Format

Figure 6:
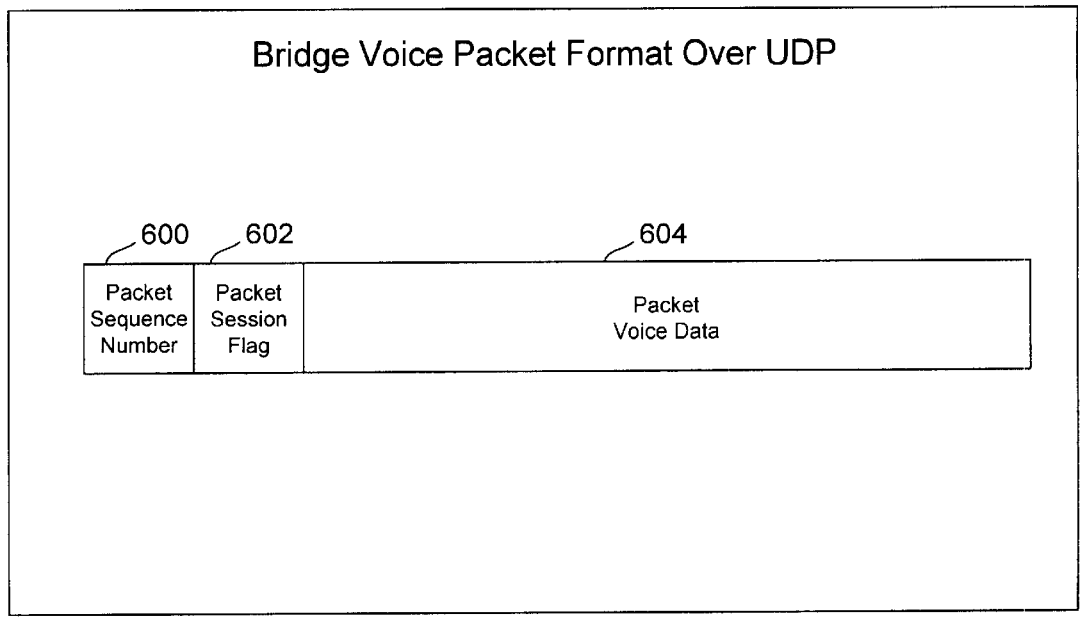
FIG. 6 is a block diagram of the format of a bridge voice packet.

An embodiment of a voice packet format that is used by the bridge is shown in FIG. 6. The voice packet format includes a packet sequence number 600, a packet session flag 602, and a packet voice data 604. The first part of the packet is sequence number 600, which is an incremental number from 0 to 255. Sequence number 600 is used to resequence packets in case the packets arrive out of sequence at the destination, and also to identify packet loss. The next section in the packet is session flag 602. Flag 602 enables the bridge to support multiple simultaneous sessions.

If session flag 602 for a particular session of bridging is set to a specific number, then all the voice packets belonging to that session will have same value. This flag value is used to separate packets based on functionality into separate sessions.

The third part of the packet is packet voice data 604, which includes the voice packets.

Sample Usage Of Bridge Session Flag

A subscriber of this service may want to listen to an e-mail message. At the beginning of the e-mail message, there is an envelope information describing, for example, the subject, sender and recipients. The envelope information is played and then the body of the e-mail is played. While listening to the e-mail, if the subscriber requests to hear the envelope information, then the call flow may use session flag 602 to distinguish the envelope information from the body of the email, and thus enable instant replay of this information. The following steps are an example of a user interaction using the session flag:

1. The call flow plays the envelope information with session flag 602 set to "1". All the voice packets that belong to the envelope information will be set to 1.
2. Call flow sets up a downstream bridging with caching for session number 1. At this point, IO thread 28 will read data from bridge port 20 and, if the session is set to 1, will store the data in bridge cache 32 and also send it over to VOIP network 102. The process continues until session "1" is complete.
3. The call flow the sets up a downstream bridging with caching for session number 2. This session contains the body of the email.
4. Now IO thread 28 starts bridging data for session number 2.
5. The user interrupts and requests for the envelope information. The bridge is suspended and the call flow issues "bridge from cache" command to IO thread 28 for session 1. The call flow also pauses TTS 106 and VC 110.
6. IO thread 28 reads from cache all the data associated with session 1 and sends the data to VOIP network 102.
7. The call flow commands IO thread 28 to "bridge from cache" for session 2. At this point IO thread 28 reads from the cache all the data for session 2 and will start sending it to VOIP network 102. When all the data in the cache for session 2 is sent, IO thread 28 will notify the call flow thread by sending a "BRIDGE CONTINUE" event, and then start reading data from the bridge port 20 and sending to VOIP network 102.
8. The call flow thread will resume operation of TTS 106 and the VC 110.

Because of the cached bridging, the user of this system may instantly listen to various parts of the data.

Voice Bridge Cache

Voice bridge cache 32 is a piece of the memory. It is used to cache the downstream bridging data. Cache 32 may store several sessions of bridging data at any given time. The cache enables instant replay of data that has been cached. Call flow thread 26 clears the cache by issuing the flush cache command to IO thread 28. Cache 32 is always in the control of the IO thread.

Bridging Commands

According to one embodiment, the following commands are supported by the bridging interface. All of these commands are asynchronous and their result will be indicated back by using events.

1. Half duplex upstream bridge start command
2. Half duplex downstream bridge start command
3. Half duplex downstream bridge start with cache command
4. Full duplex bridge start command
5. Bridge from cache command
6. Flush cache by segment
7. Flush entire cache

Bridging Events

According to one embodiment, the following events are used to indicate various conditions that could occur during bridging.

1. Bridge Done
2. Bridge Error
3. Bridge Interrupted
4. Bridge Resume
5. Bridge Started The invention has now been described with reference to the preferred embodiments. Alternatives and substitutions will now be apparent to persons of skill in the art. Accordingly, it is not intended to limit the invention except as provided by the appended claims.

What is claimed is:

1. A method for coupling external components to a VOIP network during a connection to a user, said method comprising the acts of:

providing a voice converter for transcoding voice data between VOIP format and non-VOIP formats;

opening a VOIP port for sending voice data to and receiving voice data from the VOIP network;

opening a bridge port for sending voice data to and receiving voice data from an external component;

processing requests to determine whether voice data is to be received from the external component (upstream request) or sent to the external component (downstream request);

if voice data is to be sent to the external component during the connection with the user:

receiving voice data from the user through the VOIP network via the VOIP port, wherein the voice data requires processing in a VOIP format and a non-VOIP format;

if the external component is not able to process VOIP format voice data then sending data via the bridge port to the voice converter prior to routing data to the external component; or if the external component is able to process VOIP format voice data sending data via the bridge port directly to the external component;

if voice data is to be received from the external component during the connection with the user:

if the external component provides VOIP format voice data then sending data directly to the VOIP network via the bridge port and VOIP port; or if the external component does not provide VOIP format voice data, first sending the voice data to the voice converter prior to sending the voice data to the VOIP network via the bridge port and the VOIP port to generate VOIP format voice data; and caching the generated VOIP format voice data in a cache, wherein the cached VOIP format voice data may be provided to the VOIP network when a request for the voice data is received without sending the voice data to the voice converter.

2. The method of claim 1 further comprising the acts of:

providing packets of voice data to said bridge port from an external component, with each packet of a designated portion of data including a specific session number; and wherein caching the generated voice data comprises caching data packets having the specific session number.

3. The method of claim 2 further comprising the acts of:

requesting only the designated portion of data from data packets having one or more associated session numbers to be sent to the VOIP network via the VOIP port; and transferring only cached data packets having the one or more associated session numbers via the VOIP port.

4. The method of claim 1 further comprising the acts of:

identifying silences in a voice data stream provided to the VOIP bridge;

transcoding voice data received between silences from VOIP data to ASR compatible data;

performing voice recognition on transcoded data to determine an appropriate response;

sending response voice data in VOIP format to the bridge port; and transferring response voice data to the VOIP network via the VOIP port.

5. The method of claim 4, further comprising the acts of:

specifying the duration of a transfer so that multiple external components can be multiplexed.

6. A system for coupling external components, with one of the external components being a voice converter (VC) which converts voice data between VOIP and PSTN formats, to a VOIP telecommunication application running on a server computer having a CPU, memory, and coupled to a VOIP network, said system comprising:

a gateway access telecommunication server, comprising program code executed by the CPU, which launches a channel thread for each subscriber request, wherein a subscriber request comprises VOIP data that requires processing in a VOIP format and a non-VOIP format;

a call flow thread, launched by the channel thread and comprising program code executed by the CPU, which manages call flow between the subscriber and the VOIP telecommunication application;

an I/O thread, launched by said channel thread and comprising program code executed by the CPU, which responds to call flow commands and controls input and output of data between VOIP telecommunication application and VOIP network;

a bridge cache buffer;

a bridge port, managed by the I/O thread, for transferring data between an external component and the bridge cache buffer;

a VOIP port, managed by the call flow thread, for transferring voice data between the bridge port buffer and the VOIP network;

with the call flow thread commanding the I/O thread to transfer VOIP data directly to external components that process VOIP format voice data and to transfer VOIP data via the VC to external components that do not process VOIP format voice data and with the call flow thread commanding the I/O thread to transfer voice data directly from an external component that outputs voice data in VOIP format to the VOIP network and to transfer voice data from an external component that does not output voice data in VOIP format to the VOIP network via the VC to generate voice data in a VOIP format, wherein the bridge cache buffer caches the generated VOIP data, wherein the cached VOIP format voice data may be provided to the VOIP network when a request for the voice data is received without sending the voice data to the VC.

7. A method for communicating with a user through a VOIP network using external components, wherein the external components comprise at least one external component capable of processing VOIP format voice data and at least one external component capable of processing non-VOIP format data, the method comprising:

connecting the user to a VOIP port through the VOIP network;

receiving VOIP format voice data through the VOIP network from the user, wherein the VOIP format voice data requires processing in a VOIP format and a non-VOIP format during the connection;

determining whether the VOIP format voice data requires processing in a VOIP format or a non-VOIP format;

if the VOIP format voice data should be processed in the VOIP format, bridging the VOIP format voice data directly to the at least one external component capable of processing VOIP format voice data;

if the VOIP format voice data should be processed in the non-VOIP format, converting the VOIP format voice data to the non-VOIP format data;

bridging the non-VOIP format voice data to the at least one external component capable of processing VOIP format voice data;

determining whether voice data to be sent to the user through the VOIP network is VOIP format voice data or non-VOIP format voice data;

if the voice data is VOIP format voice data, sending the data directly to the user;

if the voice data is non-VOIP format voice data, converting the non-VOIP format voice data to VOIP format voice data;

sending the data to the user; and caching the converted VOIP format voice data in a cache, wherein the cached VOIP format voice data may be provided to the VOIP network when a request for the voice data is received without converting the voice data from the non-VOIP format voice data to the VOIP format voice data.

* * * * *